United States Patent
Ahn et al.

(10) Patent No.: US 11,300,167 B2
(45) Date of Patent: Apr. 12, 2022

(54) BRAKE PAD FOR BRAKE APPARATUS

(71) Applicant: HYUNDAI MOBIS CO., LTD., Seoul (KR)

(72) Inventors: Seong Hwan Ahn, Yongin-si (KR); Kang Kuk Lee, Yongin-si (KR); Wan Kyu Lee, Yongin-si (KR); Jae Hwan Shim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 106 days.

(21) Appl. No.: 16/813,289

(22) Filed: Mar. 9, 2020

(65) Prior Publication Data

US 2021/0148421 A1    May 20, 2021

(30) Foreign Application Priority Data

Nov. 14, 2019  (KR) .................. 10-2019-0145855

(51) Int. Cl.
*F16D 55/02* (2006.01)
*F16D 65/00* (2006.01)
*F16D 65/092* (2006.01)

(52) U.S. Cl.
CPC ......... *F16D 55/02* (2013.01); *F16D 65/0068* (2013.01); *F16D 65/092* (2013.01)

(58) Field of Classification Search
CPC .. F16D 65/0971; F16D 65/0006; F16D 55/02; F16D 65/092; F16D 65/0068; F16D 65/097
See application file for complete search history.

(56) References Cited

U.S. PATENT DOCUMENTS

| | | | |
|---|---|---|---|
| 5,509,508 A * | 4/1996 | Evans | F16D 65/0006 188/73.31 |
| 9,140,322 B2 * | 9/2015 | Kobayashi | F16D 65/0006 |
| 2012/0298457 A1 | 11/2012 | Ogawa | |
| 2017/0191540 A1 * | 7/2017 | Ishikawa | F16D 65/40 |
| 2018/0094682 A1 * | 4/2018 | Satoh | F16D 65/092 |
| 2019/0128349 A1 * | 5/2019 | Clent | F16D 65/0006 |

FOREIGN PATENT DOCUMENTS

| | | |
|---|---|---|
| JP | 2015-232341 A | 12/2015 |
| KR | 10-2000-0070200 A | 11/2000 |
| KR | 10-0502515 B1 | 7/2005 |
| KR | 10-2017-0046908 A | 5/2017 |

OTHER PUBLICATIONS

Office Action of Korean Patent Application No. 10-2019-0145855—8 pages (dated Oct. 28, 2020).

* cited by examiner

*Primary Examiner* — Pamela Rodriguez
(74) *Attorney, Agent, or Firm* — Morgan, Lewis & Bockius LLP (57) ABSTRACT

A brake pad for a brake apparatus may include: a friction member brought into contact with a brake disk; a back plate coupled to the friction member, and movably mounted on a torque member or a pad liner coupled to the torque member; a slide guide shim mounted on the back plate; and a slide shim movably mounted on the back plate, covering the slide guide shim, and slidably disposed on the slide guide shim.

14 Claims, 12 Drawing Sheets

BRAKE PAD FOR BRAKE APPARATUS

CROSS-REFERENCE TO RELATED APPLICATION

The present application claims priority under 35 U.S.C. § 119(a) to Korean Patent Application No. 10-2019-0145855 filed on Nov. 14, 2019 in the Korean Intellectual Property Office, which is incorporated herein by reference in its entirety.

BACKGROUND

1. Technical Field

Embodiments of the present disclosure relate to a brake pad for a brake apparatus, and more particularly, to a brake pad for a brake apparatus, which can reduce a friction force and thus reduce noise generation.

2. Related Art

In general, a brake apparatus of a vehicle refers to an apparatus for decelerating or stopping a vehicle, and includes a brake pad for stopping a rotary motion part of a rotating body such as a wheel or spindle, which transfers power through a rotary motion, by absorbing kinetic energy of the rotary motion part in order to stop or decelerate the rotary motion part.

Among hydraulic brakes, a caliper-type brake performs a brake operation by pressing brake pads against both sides of a brake disk rotated with a wheel, using hydraulic pressure. Specifically, the caliper-type brake locates the brake disk at the central portion of a caliper body, and controls the brake pads to pressurize both surfaces of the brake disk using a piston of a cylinder during the brake operation. The brake pad includes a friction member, a back plate coupled to the friction member and a shim attached to the back plate. During a brake operation, the piston pressurizes the shim. In this case, depending on various braking states, noise may be generated to reduce a passenger's ride quality and a driver's braking force. Therefore, there is a need for a device capable of solving the problem.

The related art of the present disclosure is disclosed in Korean Patent Application Laid-Open No. 10-2017-0046908 published on May 4, 2017 and entitled "Disk Brake Apparatus for Vehicle".

SUMMARY

Various embodiments are directed to a brake pad for a brake apparatus, which can reduce a friction force and thus reduce noise generation.

In an embodiment, a brake pad for a brake apparatus may include: a friction member brought into contact with a brake disk; a back plate coupled to the friction member, and movably mounted on a torque member or a pad liner coupled to the torque member; a slide guide shim mounted on the back plate; and a slide shim movably mounted on the back plate, covering the slide guide shim, and slidably disposed on the slide guide shim.

The slide guide shim and the slide shim may be made of the same material.

The back plate may include: a back plate body having one surface to which the friction member is attached and the other surface to which the slide guide shim is coupled; a plurality of restriction protrusions formed on the other surface of the back plate body so as to be spaced apart from each other, formed through the slide guide shim and the slide shim, and configured to restrict the movement of the slide shim; and a pair of mounting protrusions formed on both sides of the back plate body so as to protrude to the outside, and movably mounted on the torque member or the pad liner.

The slide guide shim may include: a slide guide shim body brought into contact with the back plate body, and having a plurality of first restriction holes into which the plurality of restriction protrusions are inserted; and a plurality of contact clips extended from the slide guide shim body so as to be bent toward the friction member, and closely contacted with the back plate body.

The slide guide shim body may have a lubrication part having lubricating oil stored therein.

The slide guide shim may further include a buffer extended from the slide guide shim body so as to be bent toward the friction member, covering each of the pair of mounting protrusions, and having an elastic part formed at a portion brought into contact with the torque member or the pad liner.

The slide shim may include: a slide shim body brought into contact with the slide guide shim body, and having a plurality of second restriction holes into which the plurality of restriction protrusions are inserted, respectively; and a plurality of movement restriction clips extended from the slide shim body so as to be bent toward the friction member, disposed between the plurality of contact clips, and brought into contact with at least one of the contact clip and the back plate body so as to restrict the movement of the slide shim body.

The back plate may further include a separation prevention part connected to the plurality of restriction protrusions, having a larger size than the second restriction hole, and configured to prevent separation of the slide guide shim and the slide shim.

The separation prevention part may be formed by riveting the restriction protrusion.

The plurality of contact clips may include: a pair of first contact clips extended from one side of the slide guide shim body so as to be bent toward the friction member, and closely contacted with one side of the back plate body; and a pair of second contact clips extended from the other side of the slide guide shim body so as to be bent toward the friction member, and closely contacted with the other side of the back plate body.

The plurality of movement restriction clips may include a pair of first movement restriction clips disposed between the pair of first contact clips, and brought into contact with any one of the pair of first contact clips or a lateral portion of the back plate body so as to restrict the movement of the slide shim body.

The plurality of movement restriction clips may include a pair of second movement restriction clips each disposed between the first contact clip and the second contact clip, and brought into contact with the lateral portion of the back plate body so as to restrict the movement of the slide shim body.

The plurality of movement restriction clips may further include a third movement restriction clip disposed between the pair of second contact clips, and brought into contact with the lateral portion of the back plate body so as to restrict the movement of the slide shim body.

The plurality of movement restriction clips may include a pair of position restoration clips each disposed between the first contact clip and the second contact clip, and configured to return the slide shim body to the original position using an elastic restoring force.

In the brake pad for a brake apparatus in accordance with the embodiment of the present disclosure, the slide shim is slid on the slide guide shim when pressurized by the piston or brought into contact with the piston. Thus, since a friction force generated between the piston and the slide shim is reduced during a brake operation, noise generation can be reduced.

Furthermore, the slide guide shim and the slide shim are made of a stainless material. That is, the slide guide shim and the slide shim are made of the same material. Thus, galvanic corrosion can be prevented from occurring when the slide guide shim and the slide shim are contacted with each other, and excessive deformation in the slide shim can be prevented.

Furthermore, if necessary, lubricating oil may be supplied between the slide guide shim and the slide ship through the lubrication part which is formed in the slide guide shim body and has lubricating oil stored therein, such that the slide shim can be smoothly slid on the slide guide shim. Thus, the friction force generated between the slide guide shim and the slide shim can be further reduced.

Furthermore, the separation prevention part can prevent the slide guide shim and the slide shim from separating from the back plate.

Furthermore, the brake pad for a brake apparatus can be more stably moved on the torque member or the pad liner through the buffer, and noise generated by the movement can be reduced by the buffer, during a brake operation/brake release operation.

DETAILED DESCRIPTION

Hereinafter, a brake pad for a brake apparatus will be described below with reference to the accompanying drawings through various examples of embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
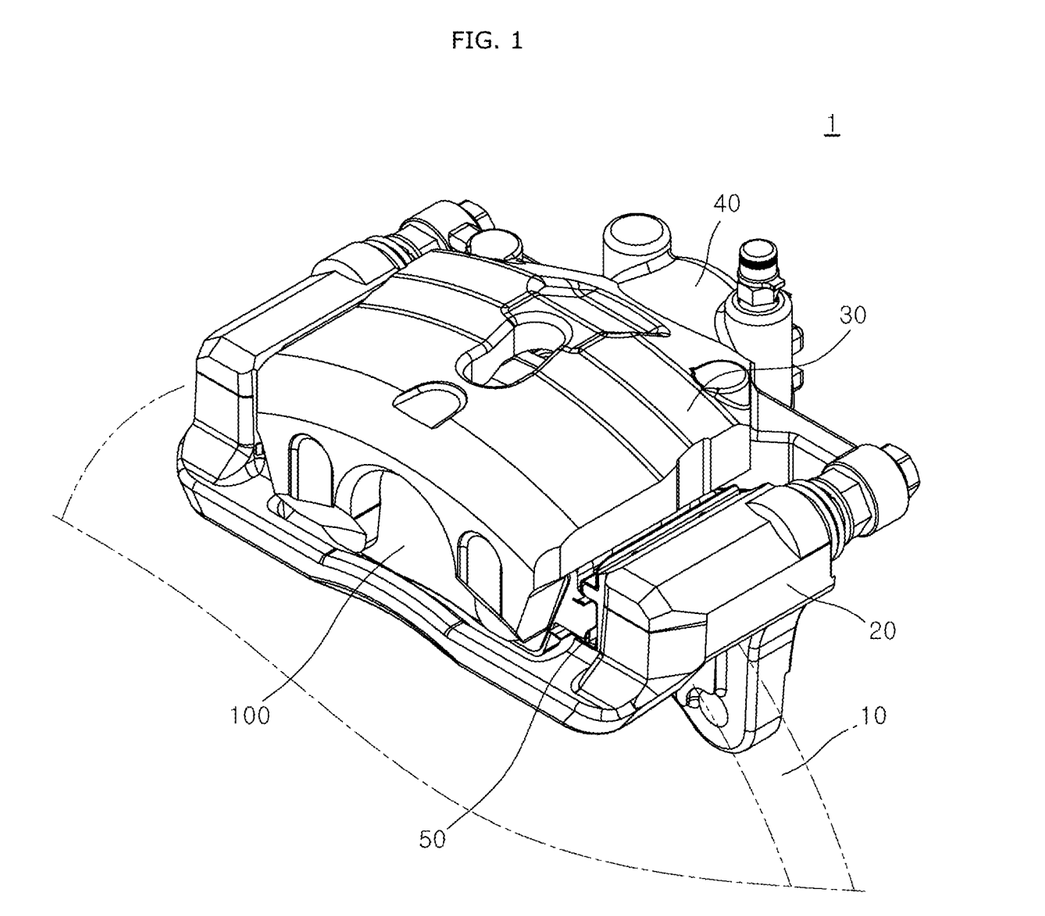
FIG. 1 is a perspective view schematically illustrating a brake apparatus to which a brake pad for a brake apparatus in accordance with a first embodiment of the present disclosure is applied.
Figure 2:
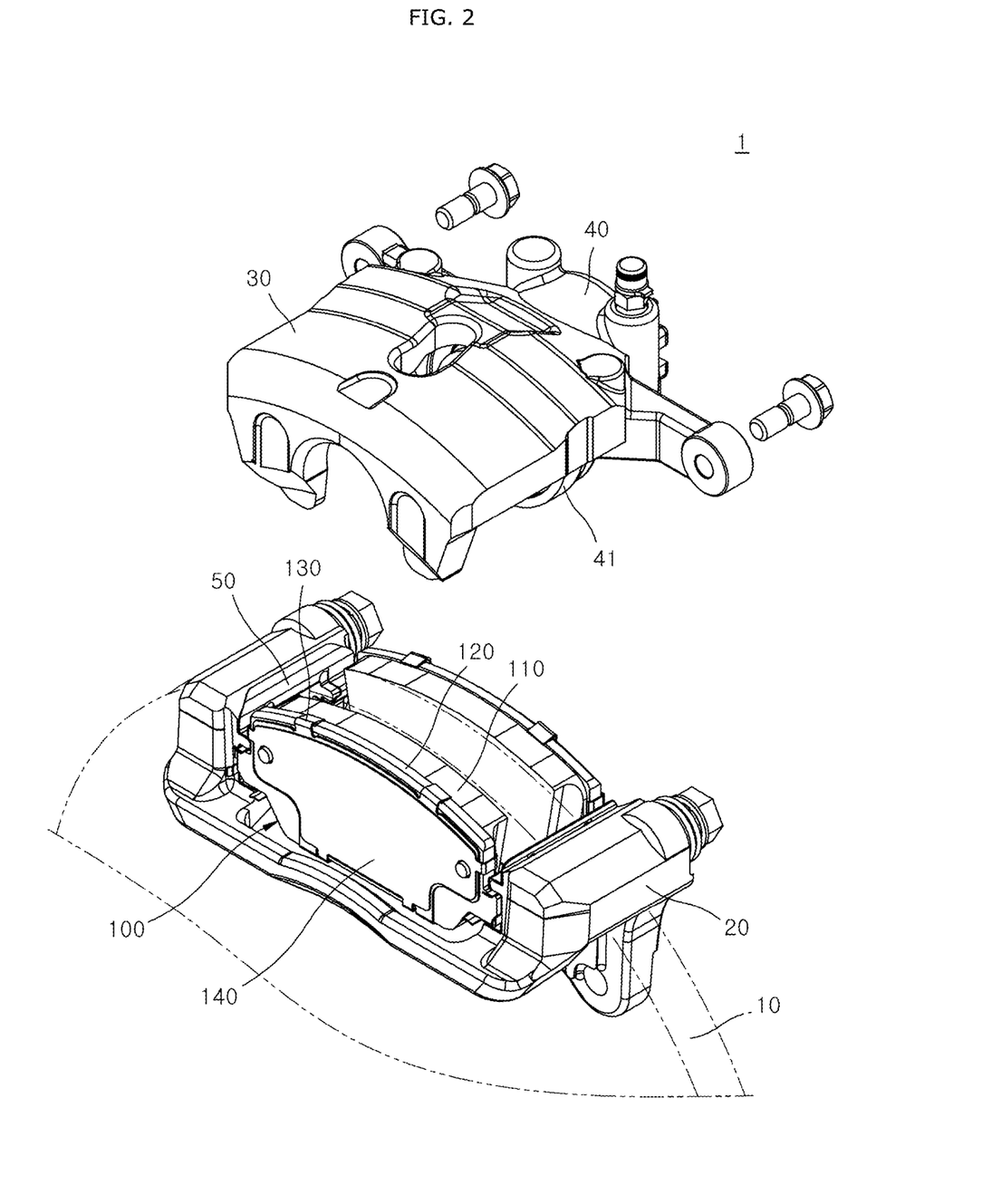
FIG. 2 is an exploded perspective view of the brake apparatus to which the brake pad for a brake apparatus in accordance with the first embodiment of the present disclosure is applied.
Figure 3:
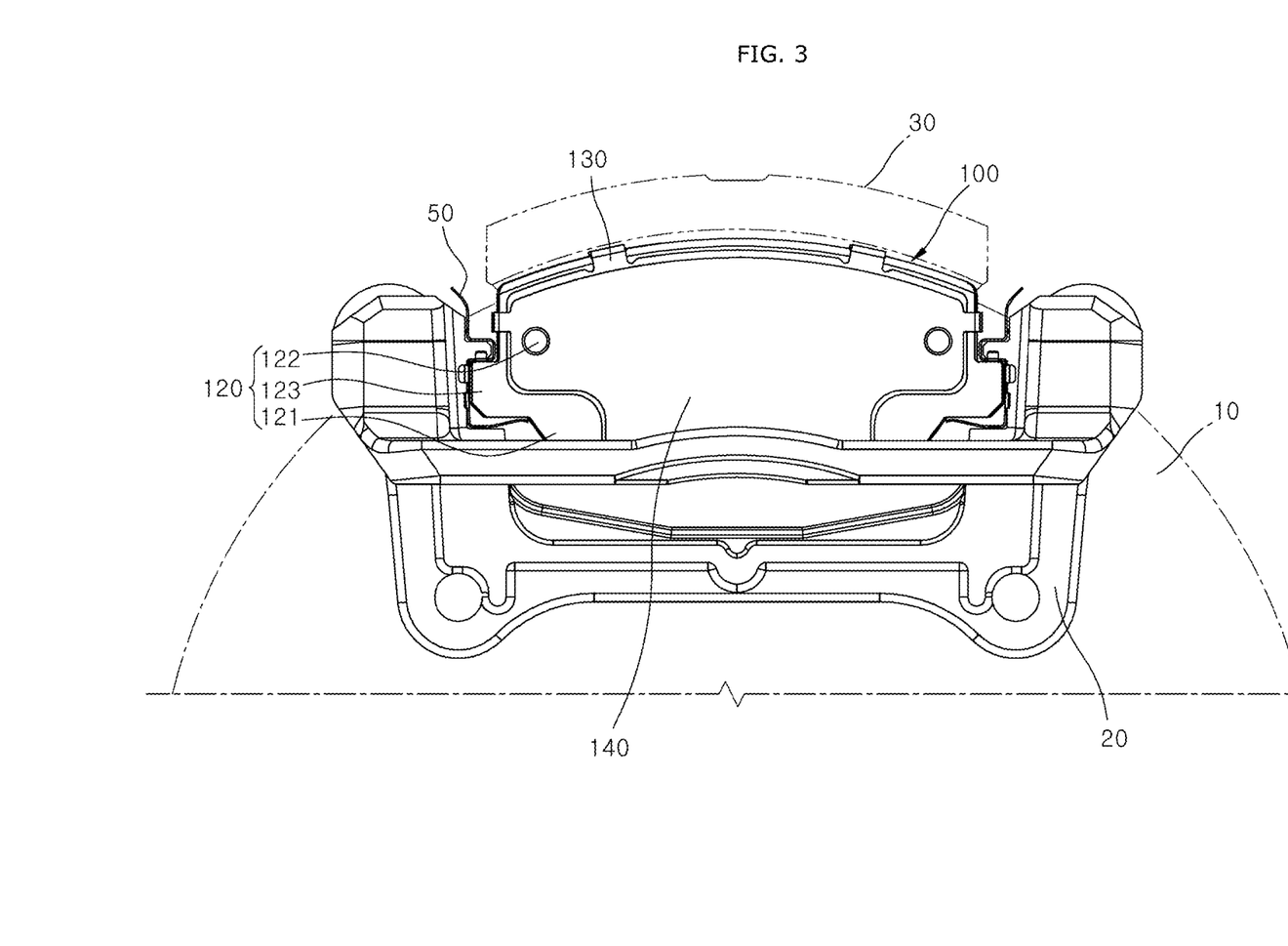
FIG. 3 is a side view of the brake apparatus to which the brake pad for a brake apparatus in accordance with the first embodiment of the present disclosure is applied.
Figure 4:
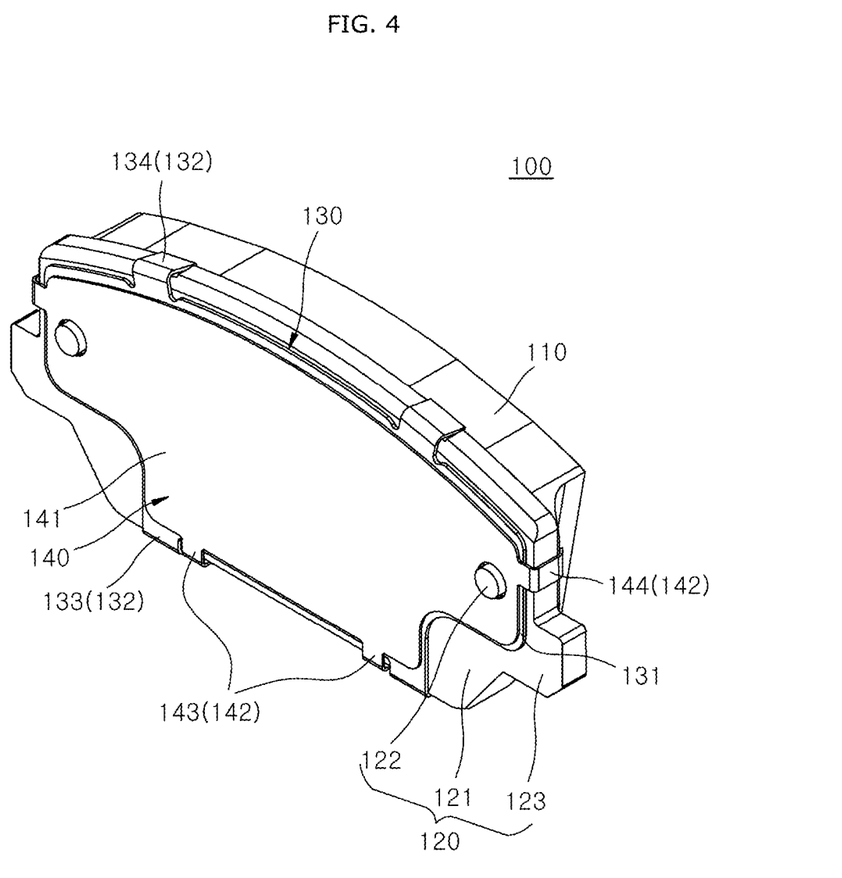
FIG. 4 is a perspective view of the brake pad for a brake apparatus in accordance with the first embodiment of the present disclosure.
Figure 5:
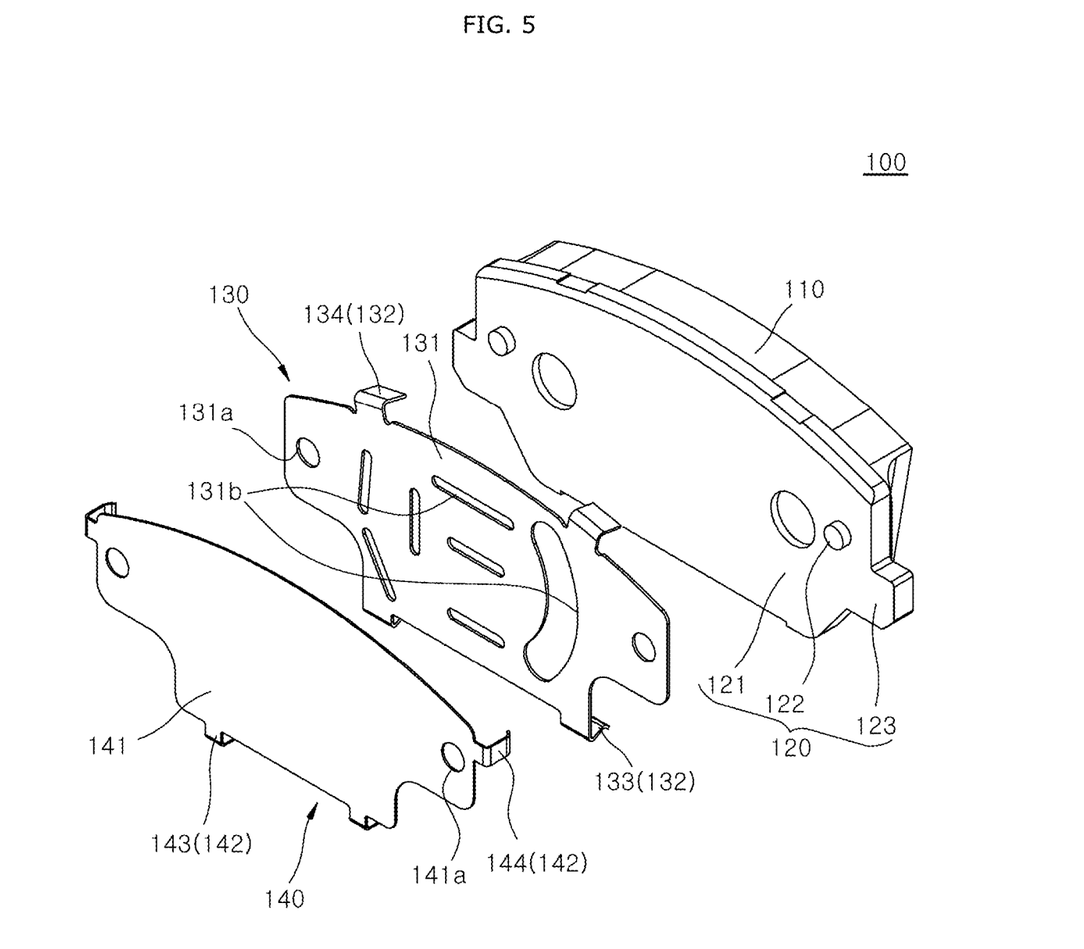
FIG. 5 is an exploded perspective view of the brake pad for a brake apparatus in accordance with the first embodiment of the present disclosure.
Figure 6:
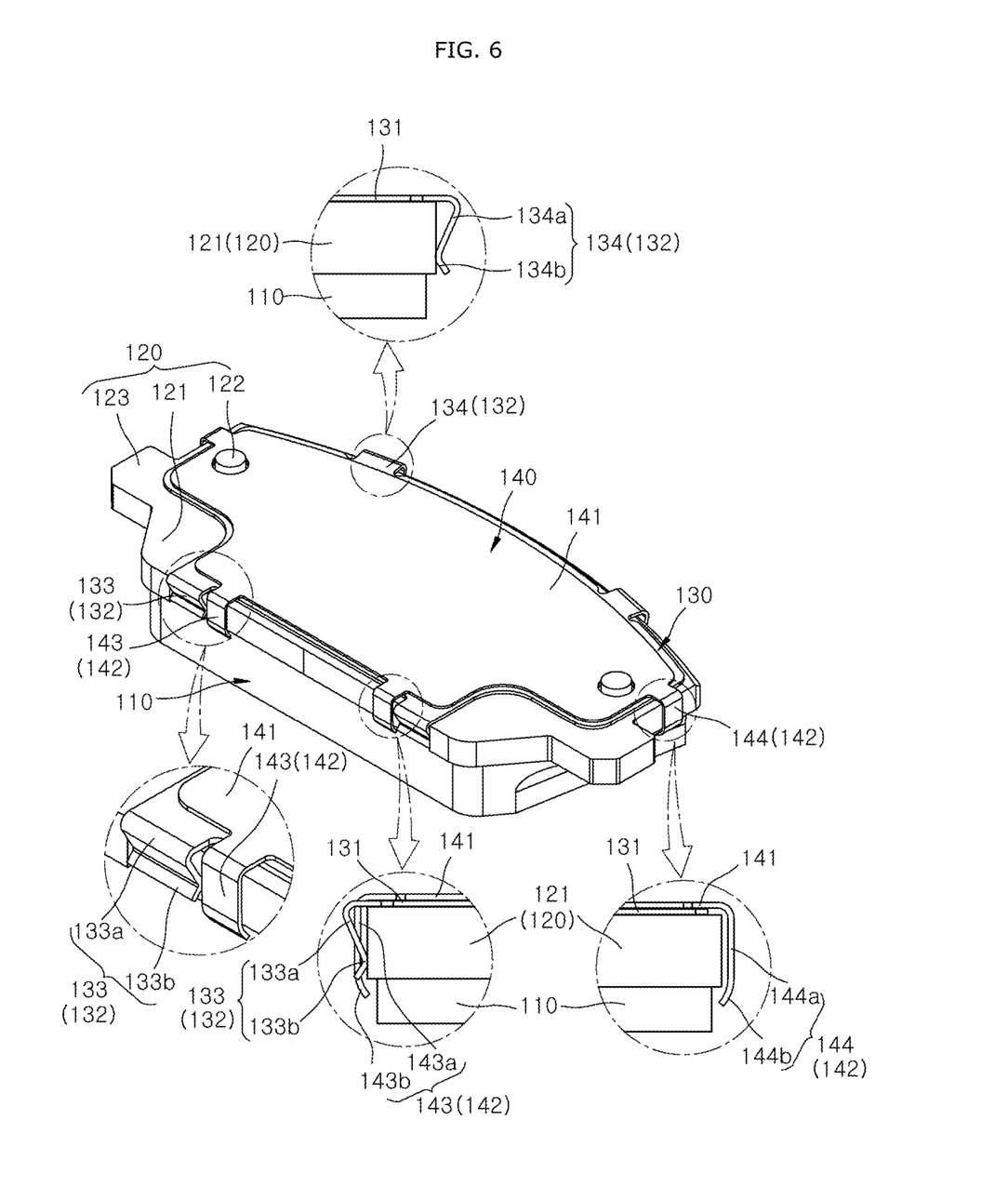
FIG. 6 is a perspective view of the brake pad for a brake apparatus in accordance with the first embodiment of the present disclosure, when seen from a different direction.
Figure 7A:
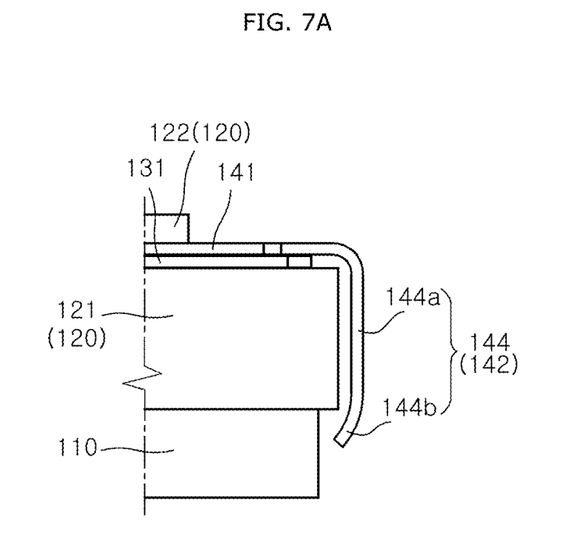
FIGS. 7A and 7B are diagrams illustrating that a slide shim of the brake pad for a brake apparatus in accordance with the first embodiment of the present disclosure is slid on a slide guide shim.
Figure 7B:
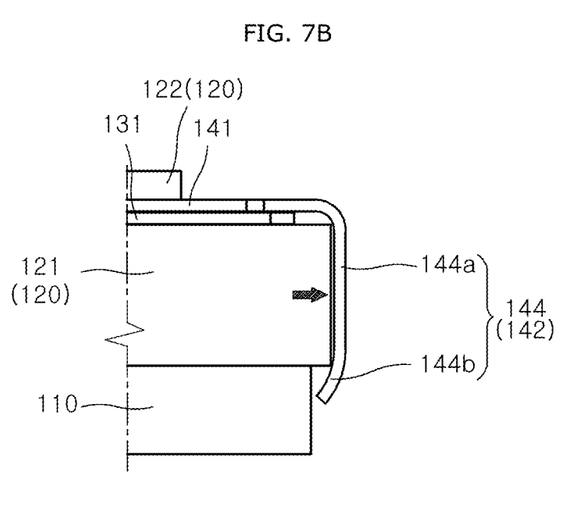

FIG. 1 is a perspective view schematically illustrating a brake apparatus to which a brake pad for a brake apparatus in accordance with a first embodiment of the present disclosure is applied, FIG. 2 is an exploded perspective view of the brake apparatus to which the brake pad for a brake apparatus in accordance with the first embodiment of the present disclosure is applied, FIG. 3 is a side view of the brake apparatus to which the brake pad for a brake apparatus in accordance with the first embodiment of the present disclosure is applied, FIG. 4 is a perspective view of the brake pad for a brake apparatus in accordance with the first embodiment of the present disclosure, FIG. 5 is an exploded perspective view of the brake pad for a brake apparatus in accordance with the first embodiment of the present disclosure, FIG. 6 is a perspective view of the brake pad for a brake apparatus in accordance with the first embodiment of the present disclosure, when seen from a different direction, and FIGS. 7A and 7B are diagrams illustrating that a slide shim of the brake pad for a brake apparatus in accordance with the first embodiment of the present disclosure is slid on a slide guide shim.

Referring to FIGS. 1 to 3, the brake apparatus 1 in accordance with the embodiment of the present disclosure includes a brake disk 10, a torque member 20, a caliper body 30, a cylinder 40, a pad liner 50 and a brake pad 100 for a brake apparatus. The brake disk 10 is formed in a disk shape, coupled to a wheel (not illustrated), and rotated with a wheel. The brake disk 10 has one surface facing the inside of a vehicle body and the other surface facing the outside of the vehicle body. In the descriptions of the present disclosure, the one surface of the brake disk 10, facing the inside of the vehicle body, is referred to as an inner surface, and the other surface of the brake disk 10, facing the outside of the vehicle body, is referred to as an outer surface.

The torque member 20 supports the brake pad 100 for a brake apparatus, and has one side facing the inner surface of the brake disk 10 and the other side facing the outer surface of the brake disk 10.

The caliper body 30 is coupled to the torque member 20, and covers the torque member 20. The caliper body 30 is coupled to the torque member 20 so as to cover the top side (based on FIG. 1) of the torque member 20.

The cylinder 40 includes a piston 41 which receives hydraulic pressure through the torque member 20 and pressurizes the brake pad 100 for a brake apparatus toward the brake disk 10.

The pad liner 50 is coupled to the torque member 20, and restores the brake pad 100 for a brake apparatus to the original position using an elastic restoring force.

The brake pad 100 for a brake apparatus is slidably mounted on the torque member 20 or the pad liner 50, and brought into contact with the brake disk 10 so as to apply a braking force. As illustrated in the drawings, the brake pad 100 for a brake apparatus in accordance with the embodiment of the present disclosure is slidably mounted on the pad liner 50 mounted on the torque member 20. However, the present embodiment is not limited thereto, but the brake pad 100 may be slidably mounted on the torque member 20 depending on a condition.

When a driver steps on a brake pedal (not illustrated), hydraulic pressure is transferred to the torque member 20. The hydraulic pressure causes the piston 41 to pressurize the brake pad 100 for a brake apparatus toward the brake disk 10. As the brake pad 100 for a brake apparatus is brought into frictional contact with the brake disk 10, a braking force is generated. At this time, the pad liner 50 is elastically deformed.

On the other hand, when the driver steps off the brake pedal during a brake release operation, hydraulic pressure is not applied to the piston 41, but the brake pad 100 for a brake apparatus is separated from the brake disk 10. At this time, the brake pad 100 for a brake apparatus may be sufficiently separated from the brake disk 10 to the left/right side (based on FIG. 2) by the elastic restoring force of the pad liner 50.

Referring to FIGS. 3 to 6, the brake pad 100 for a brake apparatus in accordance with the first embodiment of the present disclosure includes a friction member 110, a back plate 120, a slide guide shim 130 and a slide shim 140.

The friction member 110 is brought into contact with the brake disk 10. The friction member 110 is attached to the back plate 120, and brought into frictional contact with the brake disk 10.

The back plate 120 is coupled to the friction member 110, and movably mounted on the torque member 20 or the pad liner 50 coupled to the torque member 20. The back plate 120 is moved toward the brake disk 10 with the friction member 110 by the pressurization of the piston 41 during a brake operation.

The slide guide shim 130 is mounted on the back plate 120. The slide guide shim 130 is fixed to the back plate 120 so as to cover one surface of the back plate 120.

The slide shim 140 is movably mounted on the back plate 120, covers the slide guide shim 130, and is slidable on the slide guide shim 130. During a brake operation, the piston 41 is brought into contact with the slide shim 140 so as to pressurize the slide shim 140. The slide shim 140 is slid on the slide guide shim 130 in case of the pressurization of the piston 41. At this time, the slide shim 140 can be slid in a top-to-bottom or side-to-side direction (based on FIG. 4).

In the brake pad 100 for a brake apparatus in accordance with the embodiment of the present disclosure, the slide shim 140 is slid on the slide guide shim 130 when pressurized by the piston 41 or brought into contact with the piston 41. Thus, since a friction force generated between the piston 41 and the slide shim 140 is reduced, noise generation can be reduced when the brake pad 100 for a brake apparatus is moved on the torque member 20 or the pad liner 50 toward the brake disk 10.

The slide guide shim 130 and the slide shim 140 are made of a stainless material. That is, the slide guide shim 130 and the slide shim 140 are made of the same material. Thus, galvanic corrosion can be prevented from occurring when the slide guide shim 130 and the slide shim 140 are contacted with each other, and excessive deformation in the slide shim 140 can be prevented.

The back plate 120 includes a back plate body 121, a plurality of restriction protrusions 122 and a pair of mounting protrusions 123. The friction member 110 is attached to one surface of the back plate body 121, i.e. a bottom surface (based on FIG. 6), and the slide guide shim 130 is coupled to the other surface of the back plate body 121, i.e. a top surface (based on FIG. 6). That is, the friction member 110 is attached to the back plate body 121, and the slide guide shim 130 is coupled to the opposite surface of the surface to which the friction member 110 is attached.

The plurality of restriction protrusions 122 are formed on the other surface of the back plate body 121, i.e. the top surface (based on FIG. 6) so as to be spaced apart from each other, and disposed through the slide guide shim 130 and the slide shim 140 so as to restrict the movement of the slide shim 140. The plurality of restriction protrusions 122 are formed on the opposite surface of the surface on which the friction member 110 of the back plate body 121 is attached, and disposed so as to be spaced apart from each other. The plurality of restriction protrusions 122 are formed through first restriction holes 131a of the slide guide shim 130 and second restriction holes 141a of the slide shim 140, respectively.

The plurality of restriction protrusions 122 serves to prevent a slide shim body 141 from sliding on a slide guide shim body 131 beyond a preset range, when the slide shim body 141 is slid on the slide guide shim body 131 in a front-to-rear or side-to-side direction (based on FIG. 6) by the pressurization of the piston 41.

The pair of mounting protrusions 123 are formed on both sides of the back plate body 121 so as to protrude to the outside, and movably mounted on the torque member 20 or the pad liner 50. The pair of mounting protrusions 123 are moved on the torque member 20 or the pad liner 50 during a brake operation/brake release operation or when the pressurization of the piston 41 is applied or released. Thus, the brake pad 100 for a brake apparatus may be moved on the torque member 20 or the pad liner 50.

The slide guide shim 130 includes the slide guide shim body 131 and a plurality of contact clips 132. The slide guide shim body 131 is formed in a plate shape and brought into contact with the back plate body 121, and has the plurality of first restriction holes 131a into which the plurality of restriction protrusions 122 are inserted. The plurality of first restriction holes 131a are disposed on the slide guide shim body 131 so as to be spaced apart from each other at the same interval as that between the plurality of restriction protrusions 122.

The plurality of contact clips 132 are extended from the slide guide shim body 131 so as to be bent toward the friction member 110, and closely contacted with the back plate body 121.

As illustrated in FIGS. 4 to 6, the plurality of contact clips 132 are disposed along the edge of the slide guide shim body 131 so as to be spaced a predetermined distance apart from each other, extended from the slide guide shim body 131 so as to be bent toward the friction member 110, and closely contacted with the lateral portion of the back plate body 121. Thus, the slide guide shim 130 may be reliably fixed to the back plate 120.

The slide guide shim body 131 has a plurality of lubrication parts 131b for storing lubricating oil therein (see FIG. 5). Examples of the lubricating oil may include grease, and the lubricating oil may be stored in the lubrication parts 131b so as to reduce a friction force between the slide guide shim 130 and the slide shim 140. The plurality of lubrication parts 131b may be formed in a hole shape on the slide guide shim body 131 so as to be spaced apart from each other, and have different shapes and sizes.

Since the lubrication parts 131b for storing lubricant oil therein are formed in the slide guide shim body 131, lubricating oil may be supplied between the slide guide shim 130 and the slide shim 140, such that the slide shim 140 can be smoothly slid on the slide guide shim 130, thereby further reducing the friction force generated between the slide guide shim 130 and the slide shim 140.

The slide shim 140 includes the slide shim body 141 and a plurality of movement restriction clips 142. The slide shim body 141 is formed in a plate shape and brought into contact with the slide guide shim body 131, and has the plurality of second restriction holes 141a into which the plurality of restriction protrusions 122 are inserted.

The plurality of movement restriction clips 142 are extended from the slide shim body 141 so as to be bent toward the friction member 110, disposed between the respective contact clips 132, and brought into contact with at least one of the contact clip 132 and the back plate body 121 so as to restrict the movement of the slide shim body 141.

As illustrated in FIGS. 6, 7A and 7B, the plurality of movement restriction clips 142 are disposed along the edge of the slide shim body 141 so as to be spaced a predetermined distance apart from each other, extended from the slide shim body 141 so as to be bent toward the friction member 110, and disposed in a contactable manner with the lateral portion of the back plate body 121. Thus, when the slide shim body 141 is slid in the front-to-rear or side-to-side direction (see FIG. 6) on the slide guide shim body 131 by the pressurization of the piston 41, the movement restriction clips 142 may prevent the slide shim body 141 from sliding beyond a preset range.

The plurality of contact clips 132 include a pair of first contact clips 133 and a pair of second contact clips 134. The pair of first contact clips 133 are extended from one side of the slide guide shim body 131 so as to be bent toward the friction member 110, and closely contacted with one side of the back plate body 121.

As illustrated in FIG. 6, the first contact clip 133 includes a first contact clip plate 133a and a first contact clip pressing plate 133b. The first contact clip plate 133a is extended from the slide guide shim body 131 so as to be bent toward the friction member 110 while spaced apart from the back plate body 121. The first contact clip pressing plate 133b is closely contacted with the lateral portion of the back plate body 121, and presses the back plate body 121.

The pair of second contact clips 134 are extended from the other side of the slide guide shim body 131 so as to be bent toward the friction member 110, and closely contacted with the other side of the back plate body 121.

The second contact clip 134 includes a second contact clip plate 134a and a second contact clip pressing plate 134b. The second contact clip plate 134a is extended from the slide guide shim body 131 so as to be bent toward the friction member 110 while spaced apart from the back plate body 121. The second contact clip pressing plate 134b is closely contacted with the lateral portion of the back plate body 121, and presses the back plate body 121.

The plurality of movement restriction clips 142 include a pair of first movement restriction clips 143 and a pair of second movement restriction clips 144. The pair of first movement restriction clips 143 are disposed between the pair of first contact clips 133, and brought into contact with any one of the pair of first contact clips 133 or the lateral portion of the back plate body 121 so as to restrict the movement of the slide shim body 141.

The first movement restriction clip 143 includes a first movement restriction clip plate 143a and a first movement restriction clip separation prevention plate 143b. The first movement restriction clip plate 143a is extended from the slide shim body 141 so as to be bent toward the friction member 110, and disposed between the pair of first contact clips 133. The first movement restriction clip plate 143a can be brought into contact with the lateral portion of the back plate body 121.

The first movement restriction clip separation prevention plate 143b is extended from the first movement restriction clip plate 143a so as to be bent toward the back plate body 121, and brought into contact with the back plate body 121. Thus, the slide shim body 141 is prevented from being separated from the back plate body 121.

Each of the pair of second movement restriction clips 144 is disposed between the first contact clip 133 and the second contact clip 134, and brought into contact with the lateral portion of the back plate body 121 so as to restrict the movement of the slide shim body 141.

The second movement restriction clip 144 includes a second movement restriction clip plate 144a and a second movement restriction clip separation prevention plate 144b. The second movement restriction clip plate 144a is extended from the slide shim body 141 so as to be bent toward the friction member 110, and disposed between the first contact clip 133 and the second contact clip 134. The second movement restriction clip plate 144a can be brought into contact with the lateral portion of the back plate body 121.

The second movement restriction clip separation prevention plate 144b is extended from the second movement restriction clip plate 144a so as to be bent toward the back plate body 121, and brought into contact with the back plate body 121. Thus, the slide shim body 141 is prevented from being separated from the back plate body 121.

The brake apparatus 1 in accordance with the embodiment of the present disclosure has the same structure on the opposite side of the torque member 20 where the brake pad 100 for a brake apparatus is installed. Since the structure has the same operation and effect, the detailed descriptions thereof are omitted herein.

Figure 8:
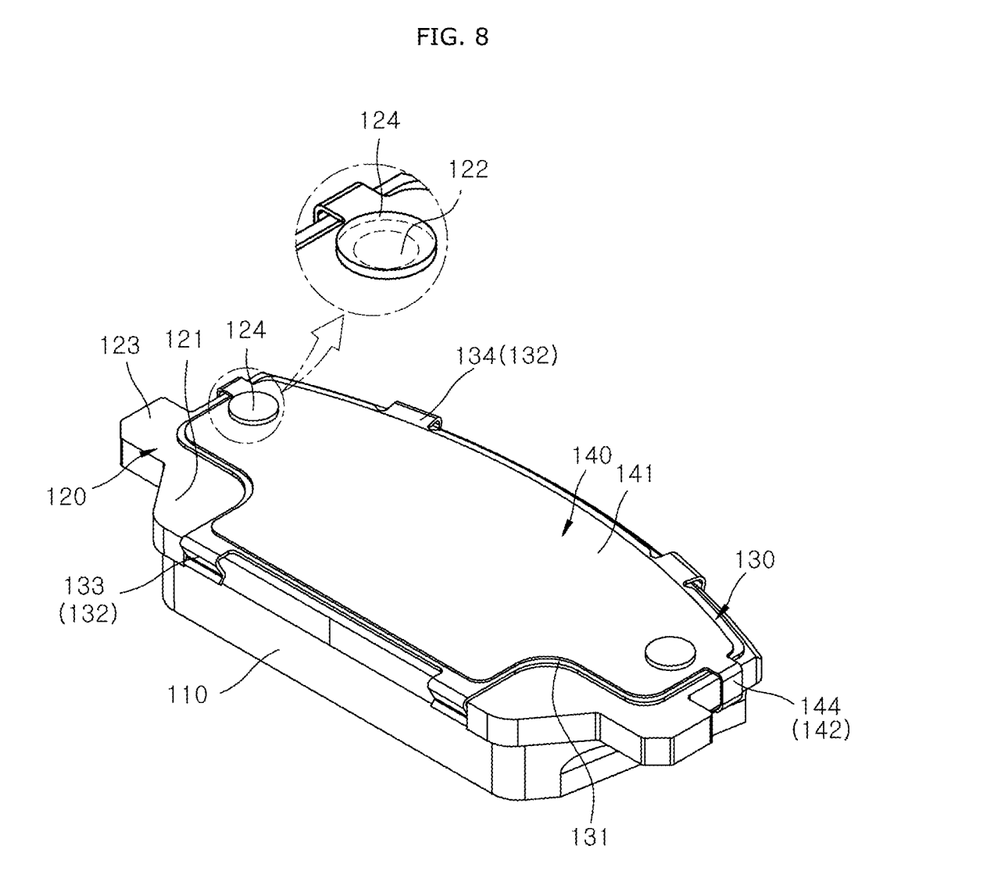
FIG. 8 is a perspective view of a brake pad for a brake apparatus in accordance with a second embodiment of the present disclosure.

FIG. 8 is a perspective view of a brake pad for a brake apparatus in accordance with a second embodiment of the present disclosure.

Hereafter, the brake pad 100 for a brake apparatus in accordance with the second embodiment of the present disclosure will be described. At this time, the detailed descriptions of the same contents as the first embodiment among the contents of the second embodiment will be omitted herein.

The plurality of movement restriction clips 142 include the pair of second movement restriction clips 144. Each of the pair of second movement restriction clips 144 is disposed between the first contact clip 133 and the second contact clip 134, and brought into contact with the lateral portion of the back plate body 121 so as to restrict the movement of the slide shim body 141.

The second movement restriction clip 144 includes the second movement restriction clip plate 144a and the second movement restriction clip separation prevention plate 144b. The second movement restriction clip plate 144a is extended from the slide shim body 141 so as to be bent toward the friction member 110, and disposed between the first contact clip 133 and the second contact clip 134. The second movement restriction clip plate 144a can be brought into contact with the lateral portion of the back plate body 121. The second movement restriction clip separation prevention plate 144b is extended from the second movement restriction clip plate 144a so as to be bent toward the back plate body 121, and brought into contact with the back plate body 121. Thus, the slide shim body 141 is prevented from being separated from the back plate body 121.

The back plate 120 further includes a separation prevention part 124. The separation prevention part 124 is connected to the pair of restriction protrusions 122, has a larger size than the second restriction hole 141a, and prevents separation of the slide guide shim 130 and the slide shim 140. The separation prevention part 124 may be formed by riveting the restriction protrusion 122. Thus, the slide guide shim 130 and the slide shim 140 can be prevented from being separated from the back plate 120. At this time, when the slide shim body 141 is slid on the slide guide shim body 131 in the front-to-rear or side-to-side direction (based on FIG. 8) by the pressurization of the piston 41, the plurality of restriction protrusions 122 can prevent the slide shim body 141 from sliding in the front-to-rear or side-to-side direction (based on FIG. 8) on the slide guide shim body 131 beyond a preset range.

Figure 9:
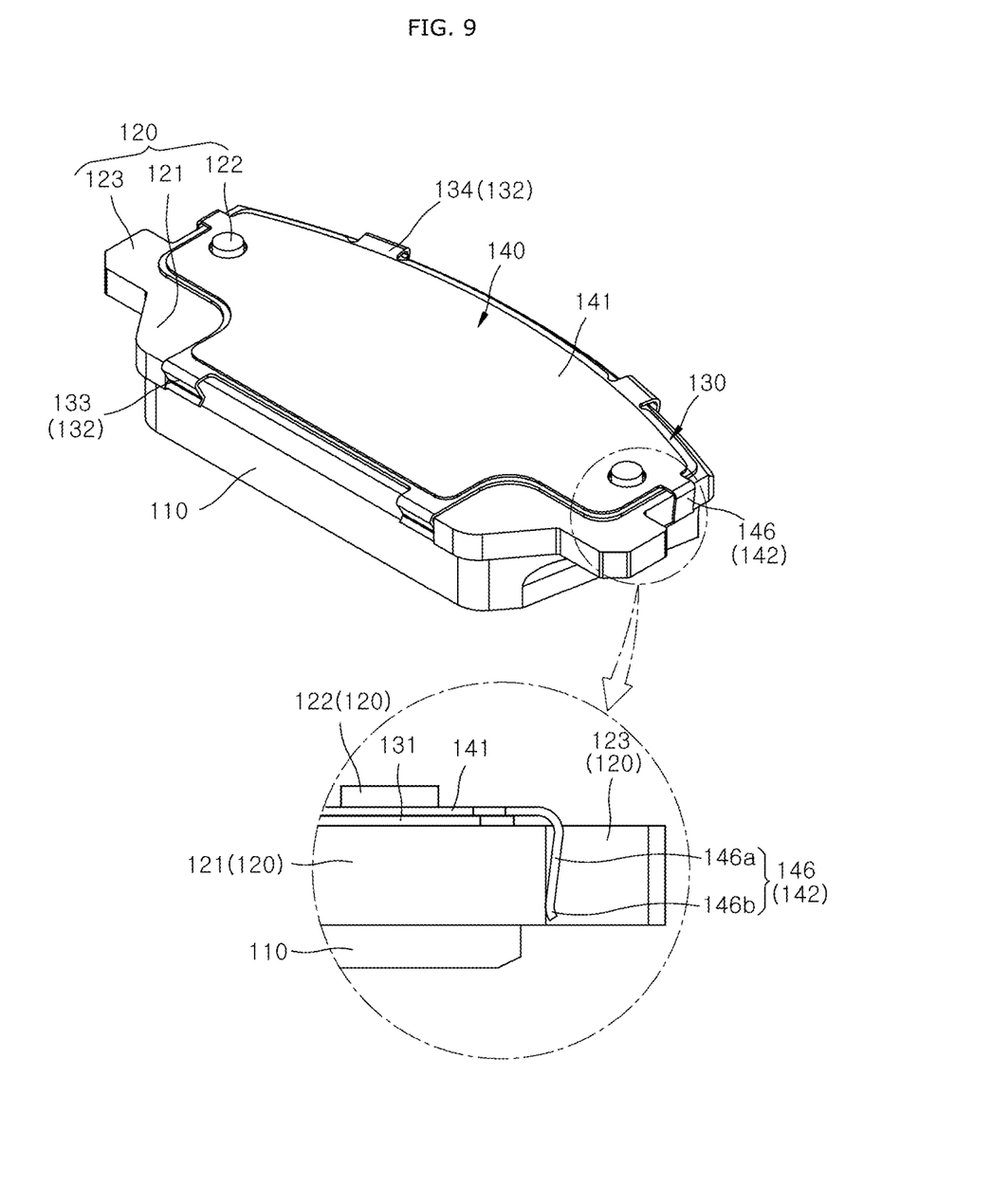
FIG. 9 is a perspective view of a brake pad for a brake apparatus in accordance with a third embodiment of the present disclosure.
Figure 10A:
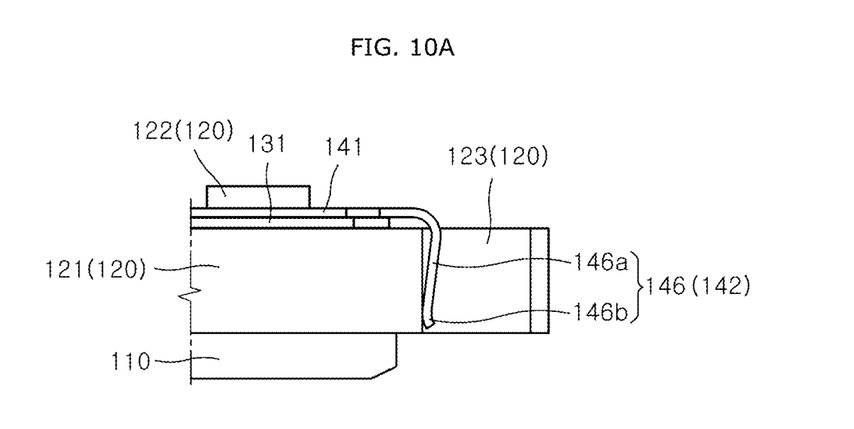
FIGS. 10A to 10C are diagrams illustrating that a slide shim of the brake pad for a brake apparatus in accordance with the third embodiment of the present disclosure is elastically deformed while slid on a slide guide shim, and returned to the original position by an elastic restoring force.
Figure 10B:
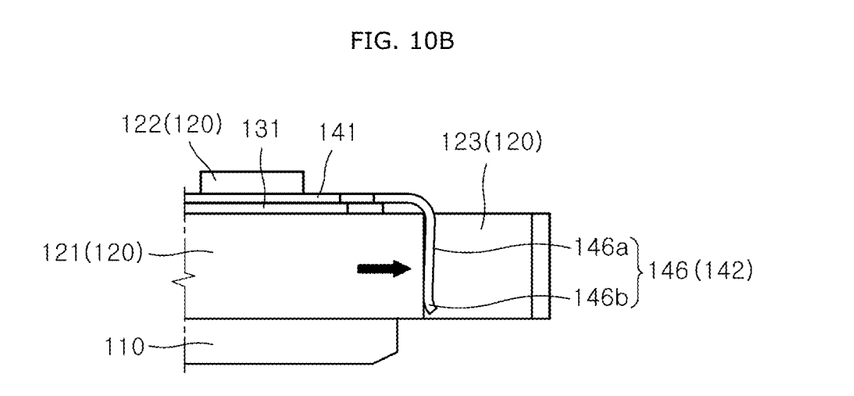
Figure 10C:
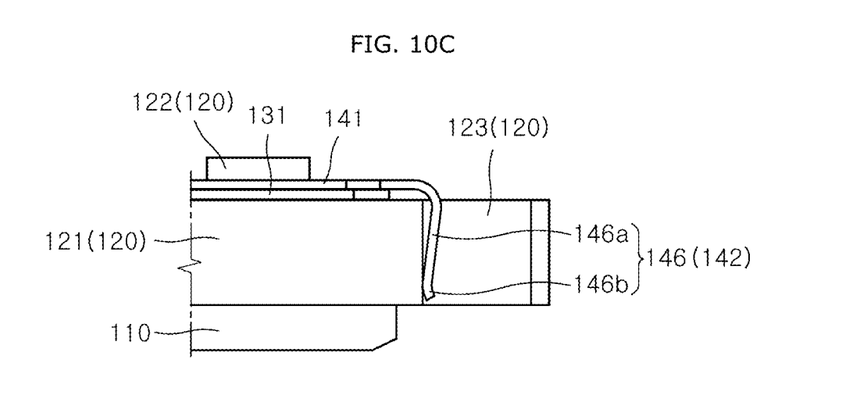

FIG. 9 is a perspective view of a brake pad for a brake apparatus in accordance with a third embodiment of the present disclosure, and FIGS. 10A to 10C are diagrams illustrating that a slide shim of the brake pad for a brake apparatus in accordance with the third embodiment of the present disclosure is elastically deformed while slid on a slide guide shim, and returned to the original position by an elastic restoring force.

Hereafter, the brake pad 100 for a brake apparatus in accordance with the third embodiment of the present disclosure will be described. At this time, the detailed descriptions of the same contents as the first and second embodiments among the contents of the third embodiment will be omitted herein.

The plurality of movement restriction clips 142 include a pair of position restoration clips 146. Each of the pair of position restoration clips 146 are disposed between the first contact clip 133 and the second contact clip 134, and returns the slide shim body 141 to the original position using an elastic restoring force.

The position restoration clip 146 includes a first position restoration clip plate 146a and a second position restoration clip plate 146b. The first position restoration clip plate 146a is extended from the slide shim body 141 so as to be bent toward the friction member 110, and disposed between the first contact clip 133 and the second contact clip 134. The first position restoration clip plate 146a is elastically deformable.

The second position restoration clip plate 146b is extended from the second movement restriction clip plate 144a so as to be bent toward the back plate body 121, and closely contacted with the back plate body 121.

When the slide shim body 141 is slid in the front-to-rear/side-to-side direction (based on FIG. 9) on the slide guide shim body 131 by the pressurization of the piston 41, the position restoration clip 146 is elastically deformed. The first position restoration clip plate 146a of the position restoration clip 146 is elastically deformed (see FIGS. 9 and 10A to 10C). At this time, when the slide shim body 141 is slid on the slide guide shim body 131 in the front-to-rear/side-to-side direction (based on FIG. 9) by the pressurization of the piston 41, the position restoration clip 146 may prevent the slide shim body 141 from sliding in the side-to-side direction (based on FIG. 9) on the slide guide shim body 131 beyond a preset range. Furthermore, the plurality of restriction protrusions 122 can prevent the slide shim body 141 from sliding in the front-to-rear direction (based on FIG. 9) on the slide guide shim body 131 beyond a preset range.

Then, when the pressurization of the piston 41 is released, the position restoration clip 146 may return the slide shim body 141 to the original position while restored to the original state by the elastic restoring force. As the first position restoration clip plate 146a of the position restoration clip 146 is restored to the original state, the slide shim body 141 is returned to the original position.

Figure 11:
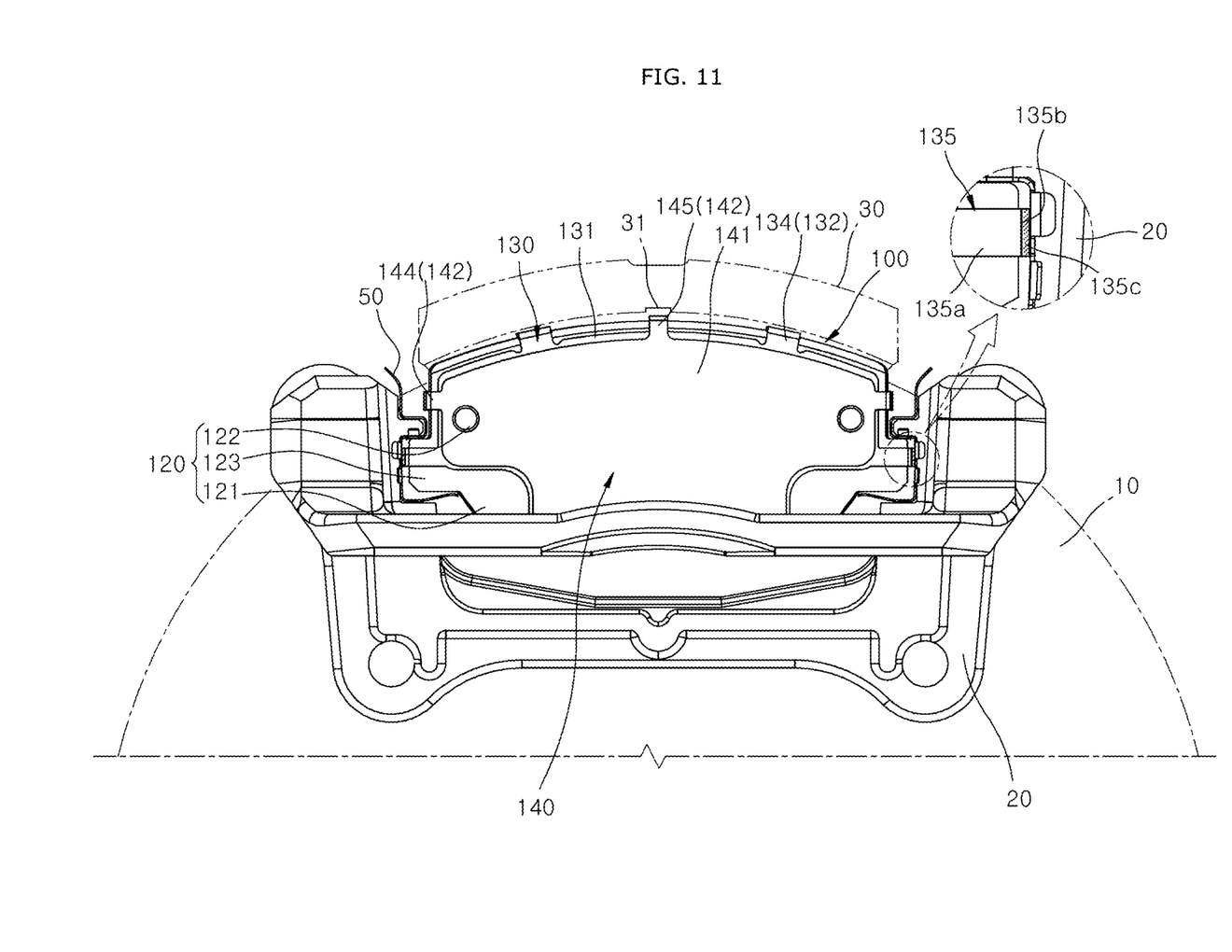
FIG. 11 is a side view of a brake apparatus to which a brake pad for a brake apparatus in accordance with a fourth embodiment of the present disclosure is applied.
Figure 12:
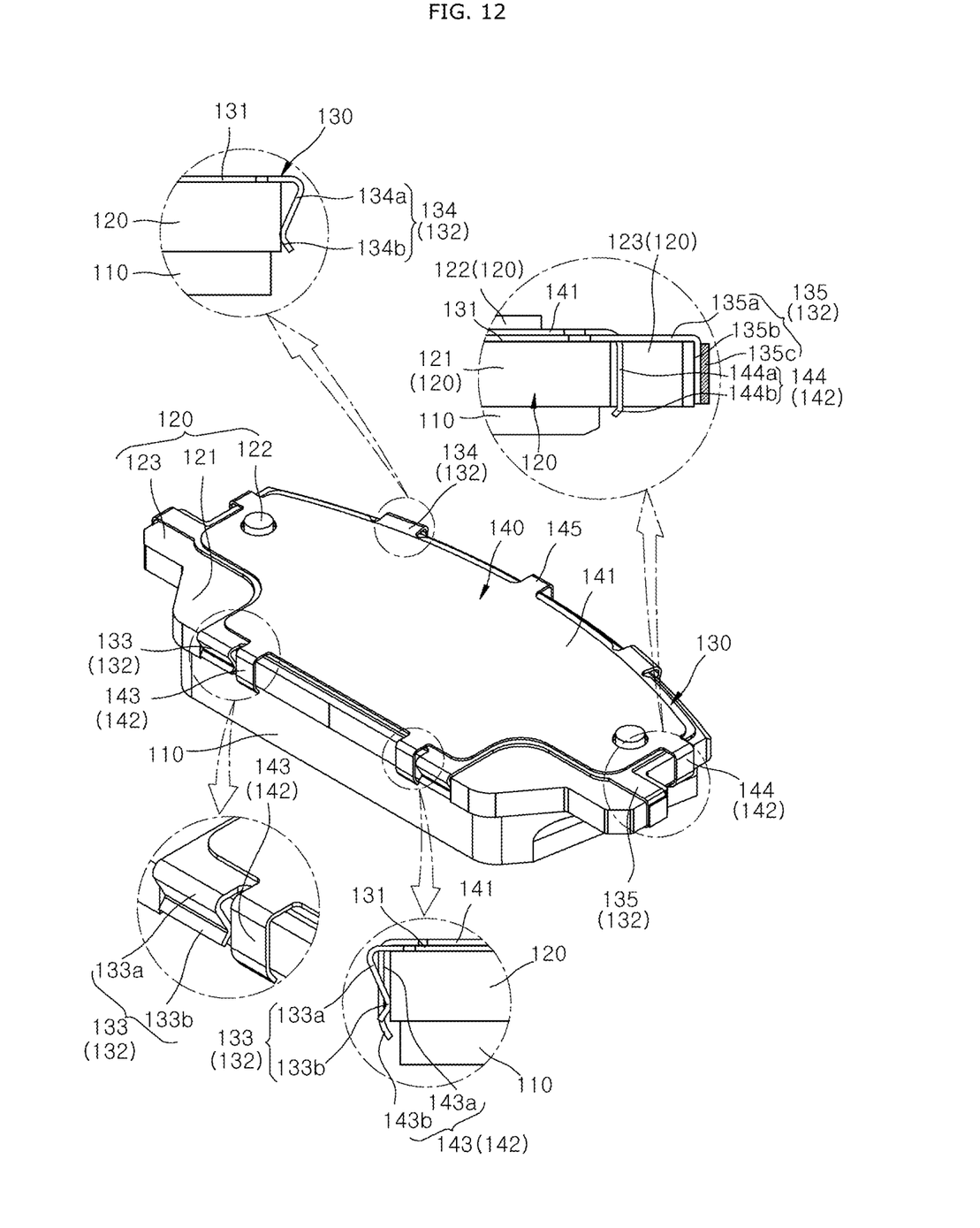
FIG. 12 is a perspective view of the brake pad for a brake apparatus in accordance with the fourth embodiment of the present disclosure.

FIG. 11 is a side view of a brake apparatus to which a brake pad for a brake apparatus in accordance with a fourth embodiment of the present disclosure is applied, and FIG. 12 is a perspective view of the brake pad for a brake apparatus in accordance with the fourth embodiment of the present disclosure.

Hereafter, the brake pad 100 for a brake apparatus in accordance with the fourth embodiment of the present disclosure will be described. At this time, the detailed descriptions of the same contents as the first to third embodiments among the contents of the fourth embodiment will be omitted herein.

The plurality of movement restriction clips 142 include the pair of first movement restriction clips 143, the pair of second movement restriction clips 144 and a third movement restriction clip 145. The third movement restriction clip 145 is disposed between the pair of second contact clips 134, and brought into contact with the lateral portion of the back plate body 121 so as to restrict the movement of the slide shim body 141.

The third movement restriction clip 145 includes a third movement restriction clip plate and a third movement restriction clip separation prevention plate. The third movement restriction clip plate is extended from the slide shim body 141 so as to be bent toward the friction member 110, and disposed between the pair of second contact clips 134. The third movement restriction clip plate can be brought into contact with the lateral portion of the back plate body 121.

The third movement restriction clip separation prevention plate 145b is extended from the third movement restriction clip plate 145a so as to be bent toward the back plate body 121, and brought into contact with the back plate body 121. Thus, the slide shim body 141 is prevented from being separated from the back plate body 121.

The slide guide shim 130 further includes a buffer 135. The buffer 135 is extended from the slide guide shim body 131 so as to be bent toward the friction member 110, covers each of the pair of mounting protrusions 123, and includes an elastic part 135c formed at a portion brought into contact with the torque member 20 or the pad liner 50.

The buffer 135 includes a first buffer plate 135a, a second buffer plate 135b and the elastic part 135c. The first buffer plate 135a is extended from the slide guide shim body 131 to one side, and brought into contact with the mounting protrusion 123. Specifically, the first buffer plate 135a is extended from the slide guide shim body 131 to the left/right side (based on FIG. 12), and brought into contact with the mounting protrusion 123. The second buffer plate 135b is extended from the first buffer plate 135a so as to be bent toward the friction member 110, and covers the mounting protrusion 123. The elastic part 135c is attached to the second buffer plate 135b so as to be brought into contact with the torque member 20 or the pad liner 50. Thus, during a brake operation/brake release operation, the brake pad 100 for a brake apparatus can be moved more stably on the torque member 20 or the pad liner 50, and noise generated while the brake pad 100 is moved can be reduced.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake pad for a brake apparatus, comprising:
    a friction member brought into contact with a brake disk;
    a back plate coupled to the friction member, and movably mounted on a torque member or a pad liner coupled to the torque member;
    a slide guide shim mounted on the back plate; and
    a slide shim movably mounted on the back plate, covering the slide guide shim, and slidably disposed on the slide guide shim,
    wherein the back plate comprises:
        a back plate body having one surface to which the friction member is attached and the other surface to which the slide guide shim is coupled; and
        a pair of mounting protrusions disposed on both sides of the back plate body so as to protrude to the outside, and movably mounted on the torque member or the pad liner,
    wherein the slide guide shim comprises:
        a slide guide shim body brought into contact with the back plate body; and
        a buffer extending from the slide guide shim body so as to be bent toward the friction member, and covering each of the pair of mounting protrusions.

2. The brake pad of claim 1, wherein the slide guide shim and the slide shim are made of the same material.

3. The brake pad of claim 1, wherein the back plate further comprises:
    a plurality of restriction protrusions disposed on the other surface of the back plate body so as to be spaced apart from each other, extending through the slide guide shim and the slide shim, and configured to restrict the movement of the slide shim.

4. The brake pad of claim 3, wherein the slide guide shim body has a plurality of first restriction holes into which the plurality of restriction protrusions are inserted, and
    wherein the slide guide shim further comprises a plurality of contact clips extending from the slide guide shim body so as to be bent toward the friction member, and closely contacted with the back plate body.

5. The brake pad of claim 4, wherein the slide guide shim body has a lubrication part having lubricating oil stored therein.

6. The brake pad of claim 4, wherein the has an elastic part disposed at a portion brought into contact with the torque member or the pad liner.

7. The brake pad of claim 4, wherein the slide shim comprises:
    a slide shim body brought into contact with the slide guide shim body, and having a plurality of second restriction holes into which the plurality of restriction protrusions are inserted, respectively; and
    a plurality of movement restriction clips extending from the slide shim body so as to be bent toward the friction member, disposed between the plurality of contact clips, and brought into contact with at least one of the contact clips and the back plate body so as to restrict the movement of the slide shim body.

8. The brake pad of claim 7, wherein the back plate further comprises a separation prevention part connected to the plurality of restriction protrusions, having a larger size than the second restriction holes, and configured to prevent separation of the slide guide shim and the slide shim.

9. The brake pad of claim 8, wherein the separation prevention part is formed by riveting each of the restriction protrusions.

10. The brake pad of claim 7, wherein the plurality of contact clips comprise:
    a pair of first contact clips extending from one side of the slide guide shim body so as to be bent toward the friction member, and closely contacted with one side of the back plate body; and
    a pair of second contact clips extending from the other side of the slide guide shim body so as to be bent toward the friction member, and closely contacted with the other side of the back plate body.

11. The brake pad of claim 10, wherein the plurality of movement restriction clips comprise a pair of first movement restriction clips disposed between the pair of first contact clips, and brought into contact with any one of the pair of first contact clips or a lateral portion of the back plate body so as to restrict the movement of the slide shim body.

12. The brake pad of claim 11, wherein the plurality of movement restriction clips comprise a pair of second movement restriction clips each disposed between respective ones of the first contact clips and the second contact clips, and brought into contact with the lateral portion of the back plate body so as to restrict the movement of the slide shim body.

13. The brake pad of claim 12, wherein the plurality of movement restriction clips further comprise a third movement restriction clip disposed between the pair of second contact clips, and brought into contact with the lateral portion of the back plate body so as to restrict the movement of the slide shim body.

14. The brake pad of claim 10, wherein the plurality of movement restriction clips comprise a pair of position restoration clips each disposed between respective ones of the first contact clips and the second contact clips, and configured to return the slide shim body to the original position using an elastic restoring force.

* * * * *